United States Patent
Subburaj et al.

(10) Patent No.: US 11,630,185 B2
(45) Date of Patent: Apr. 18, 2023

(54) CASCADED RADAR SYSTEM CALIBRATION OF BASEBAND IMBALANCES

(71) Applicant: TEXAS INSTRUMENTS INCORPORATED, Dallas, TX (US)

(72) Inventors: Karthik Subburaj, Bangalore (IN); Vashishth Dudhia, Gujarat (IN); Shailesh Joshi, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 202 days.

(21) Appl. No.: 17/097,390

(22) Filed: Nov. 13, 2020

(65) Prior Publication Data
US 2021/0149019 A1    May 20, 2021

(30) Foreign Application Priority Data

Nov. 14, 2019   (IN) .............................. 201941046299

(51) Int. Cl.
*G01S 7/40* (2006.01)
(52) U.S. Cl.
CPC .............. *G01S 7/40* (2013.01); *G01S 7/4021* (2013.01); *G01S 7/4017* (2013.01)
(58) Field of Classification Search
CPC ......... G01S 7/40; G01S 7/4017; G01S 7/4021
See application file for complete search history.

(56) References Cited

U.S. PATENT DOCUMENTS

| | | | |
|---|---|---|---|
| 2011/0194656 A1* | 8/2011 | Shaked | H04L 27/3863 375/346 |
| 2015/0255868 A1* | 9/2015 | Haddad | H04B 17/12 342/368 |
| 2020/0158821 A1* | 5/2020 | Doare | H04B 17/12 |

* cited by examiner

*Primary Examiner* — Timothy X Pham
(74) *Attorney, Agent, or Firm* — Michael T. Gabrik; Frank D. Cimino

(57) ABSTRACT

A method for calibrating a cascaded radar system includes transmitting first radar transmission signal from a radar device. First radar reflection signals corresponding to the respective first radar transmission signal reflected from calibration target are received at each of the radar devices. The first radar reflection signals are demodulated to generate first baseband signals at each of the radar devices. A second radar transmission signal is modulated with respect to the first radar transmission signal at the respective one of the radar devices. The second radar transmission signal is transmitted from the respective one of the radar devices and are received as second radar reflection signals at each of the radar devices. The second radar reflection signals are demodulated to generate second baseband signals at each of the radar devices, and each of the radar devices are calibrated based on the first and second baseband signals.

12 Claims, 4 Drawing Sheets

CASCADED RADAR SYSTEM CALIBRATION OF BASEBAND IMBALANCES

CROSS REFERENCE TO RELATED APPLICATIONS

This application claims priority from India Provisional Application Serial No. 201941046299, filed 14 Nov. 2019, which is incorporated herein in its entirety.

TECHNICAL FIELD

This disclosure relates generally to radar devices, and more specifically to a cascaded radar system calibration.

BACKGROUND

Radar devices have existed for decades to determine the location of physical objects using transmitted and reflected radio waves. Radar devices can be used in a cascaded radar system, in which multiple radar devices are implemented to perform beam-forming in which the radar beams can be directionally provided through a phased-array technique. As a result, the beam-forming of radar beams can achieve higher angular resolution and better signal strength for long range applications. Cascaded radar systems typically include a master device and one or more slave devices which share the local oscillator and digital frame synchronization signal in order to achieve synchronization of frame trigger across devices. However, process variation across cascaded devices can lead to potential mismatch in digital synchronization delay as well as analog baseband filter parameters, which can result in baseband signal gain and phase imbalances across the cascaded radar devices.

SUMMARY

One example method for calibrating a cascaded radar system includes transmitting first radar transmission signal from a radar device. First radar reflection signals corresponding to the respective first radar transmission signal reflected from a calibration target are received at each of the radar devices. The first radar reflection signals are demodulated to generate first baseband signals at each of the radar devices. A second radar transmission signal is modulated with respect to the first radar transmission signal at the respective one of the radar devices. The second radar transmission signal is transmitted from the respective one of the radar devices and are received as second radar reflection signals at each of the radar devices. The second radar reflection signals are demodulated to generate second baseband signals at each of the radar devices, and each of the radar devices are calibrated based on the first and second baseband signals.

Another example includes a radar device. The radar device includes an antenna system having an input and an output and a transmitter having an input and an output coupled to the input of the antenna. The transmitter can provide frequency modulated continuous wave (FMCW) signals. The radar device also includes a frequency modulator having an output coupled to the input of the transmitter. The frequency modulator modulates the FMCW signals. The radar device further includes a receiver having an input coupled to the output of the antenna and an output, and a digital front end having an input coupled to the output of the receiver and having a calibration component. The calibration component can phase-shift digital samples of received reflected FMCW signals.

Another example includes a cascaded radar calibration environment. The system includes a plurality of radar devices. Each of the radar devices includes a transmitter configured to transmit frequency modulated continuous wave (FMCW) transmission signals and a receiver configured to receive reflected FMCW signals. Each of the radar devices also includes a digital front-end having a calibration component. The calibration component can be configured to phase-shift digital samples of the modulated reflected FMCW signals of frequency-modulated FMCW transmission signals provided from one of the plurality of radar devices and reflected from the calibration target. The phase-shifted digital samples can time-align the respective one of the plurality of radar devices to at least one other of the plurality of radar devices.

DETAILED DESCRIPTION

Figure 1:
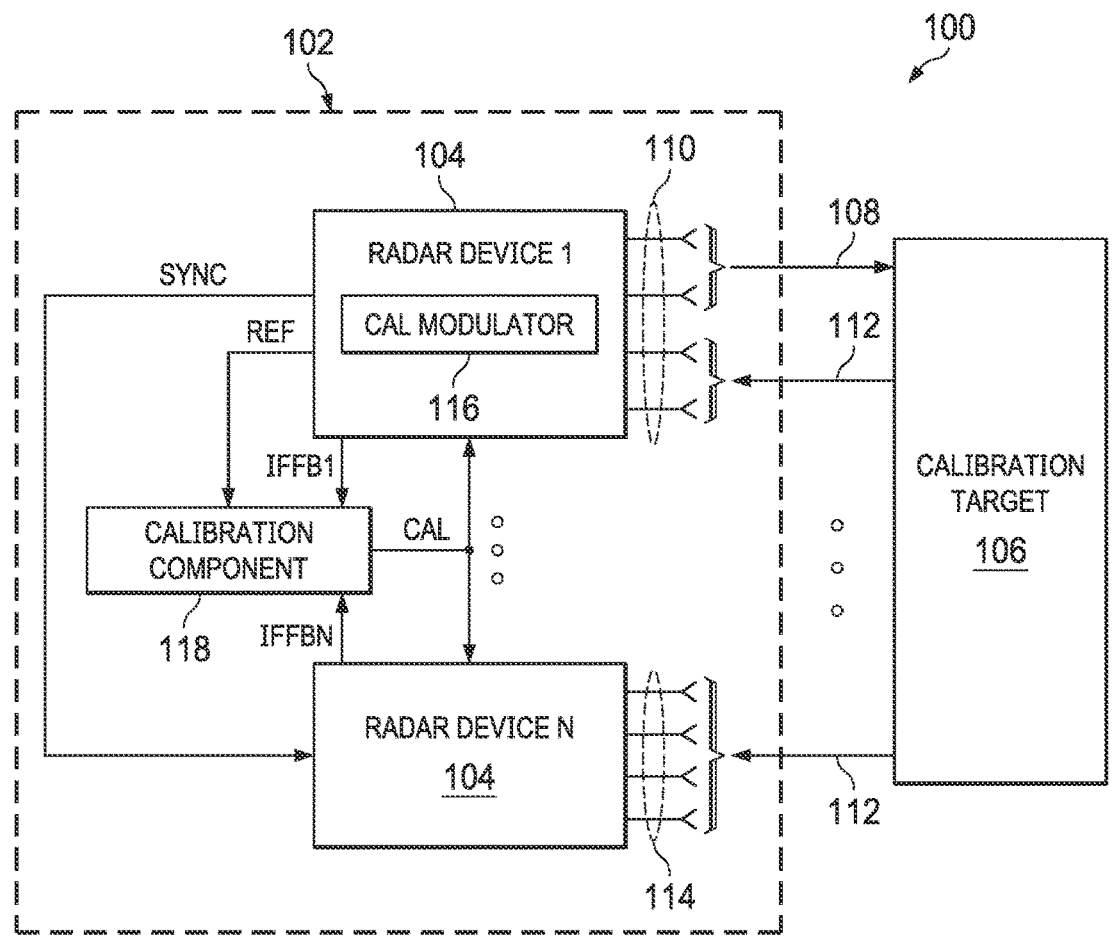
FIG. 1 illustrates an example of a diagram of a calibration environment for a cascaded radar system.

This disclosure relates generally to radar devices, and more specifically to a cascaded radar system calibration. A cascaded radar system can include a plurality of radar devices that can each include at least one transmitter and at least one receiver, and can thus work in concert to provide beamforming in a radar imaging application. As an example, each of the radar devices can transmit radar signals, such as frequency modulated continuous wave (FMCW) signals that are reflected from a target and received by each of the radar devices. The reflected FMCW signals can be demodulated to an intermediate frequency (IF) baseband signal and processed for range determination. For example, one of the radar devices can be configured as a master device while the remaining radar devices can be configured as slave devices. For example, the master device can provide a digital frame synchronization signal to the slave devices to time-align the radar devices for providing coordinated radar imaging. However, inherent manufacturing process variations and baseband analog filter variations can result in delay imbalances between the radar devices, as well as phase and amplitude mismatches between the radar devices with respect to the processed digital IF baseband data.

To overcome the delay imbalances, as well as the phase and amplitude mismatches, of the cascaded radar system, the cascaded radar system can be calibrated as part of a calibration environment. The calibration environment can include the radar devices and a calibration target. As described herein, the calibration procedure can allow for the calibration target to be positioned at a same single stationary location relative to the plurality of radar devices during an entirety of an associated calibration procedure. Some comparable calibration procedures require that the calibration target be moved to different physical locations while maintaining a same orientation of the reflector to simulate different ranges of targets for the cascaded radar system. Such movement of the calibration target can be time consuming, can require a large amount of physical space for conducting the calibration, and can be prone to errors. However, by modulating the frequency of the FMCW signals transmitted by one of the radar devices during the calibration procedure, the variations of range can be simulated without physically moving the calibration target.

For example, during the calibration procedure, one of the radar devices can transmit a first radar signal (e.g., an FMCW signal) at a baseline, unmodified IF frequency range spectrum. The reflected radar signal can be received by each of the radar devices and demodulated to obtain a first IF baseband signal that includes a range peak that can identify the range of the calibration target. Subsequently, the respective one of the radar devices can modulate the IF frequency (e.g., phase modulate or frequency modulate) of the baseline IF frequency range to generate a second radar signal at the modulated IF frequency range. Each of the radar devices can demodulate the reflected radar signal corresponding to the second radar signal to obtain a second IF baseband signal. The location of the range peak can be determined in the second IF baseband signal and can be compared with the location of the range peak in the first IF baseband signal, as well as compared with the location of the range peak in the second IF baseband signal of the other radar devices, to determine an inter-device delay between the radar devices. Additional radar signals after the second radar transmission signal can follow, with each of the radar transmission signals having different modulation of frequencies and/or phases.

The cascaded radar system can include a calibration component that can calibrate the radar devices to mitigate IF baseband signal imbalances based on the location of the range peaks in the IF baseband signals. For example, in response to determining the delay of the respective one of the radar devices, the calibration component can be configured to provide a phase-shift of the digital samples of the IF baseband signals of the received radar signals. For example, the calibration component can provide a sample shift in a first-in-first-out buffer (FIFO) in a digital front end of at least one of the radar devices to provide a coarse adjustment to the phase of the digital samples. As another example, the calibration component can adjust a fractional sample delay of a group delay filter in the digital front end of at least one of the radar devices to provide a fine adjustment to the phase of the digital samples. Furthermore, the calibration component can adjust a cutoff frequency of an IF bandpass filter in the digital front end of at least one of the radar devices to compensate for gain and phase imbalances resulting from an IF bandpass filter mismatch of the respective radar device relative to the other radar devices.

FIG. 1 illustrates a diagram 100 of a calibration environment for a cascaded radar system 102. The cascaded radar system 102 includes a plurality N of radar devices 104 that can operate to collectively provide radar imaging, such as based on beamforming to achieve higher angular resolution and better signal strength for long range applications. In the example of FIG. 1, the radar devices 104 are coupled to each other through one or more synchronization signals SYNC. As an example, the synchronization signal(s) SYNC can be one or more digital frame synchronization signals (e.g., provided from a master device to slave devices) to time-align the radar devices 104 for providing coordinated radar imaging. However, inherent manufacturing process variations and baseband analog filter variations can result in delay imbalances between the radar devices 104, as well as phase and amplitude mismatches between the radar devices 104 with respect to processed digital intermediate frequency (IF) baseband data corresponding to reflected radar transmission signals (e.g., frequency-modulated continuous wave (FMCW) signals).

The calibration environment can be implemented to calibrate the cascaded radar system 102 to compensate for delay imbalances between the radar devices 104, as well as phase and amplitude mismatches between the radar devices 104 with respect to received digital IF baseband data of reflected radar signals, such as resulting from the manufacturing process variations. For example, the calibration procedure can be implemented in a factory setting, such as after manufacture of the cascaded radar system 102. As another example, the calibration procedure can be implemented periodically in the field to provide run-time calibration.

The calibration environment also includes a calibration target 106. As an example, the calibration target can be a device (e.g., a reflector) designed for performing the calibration procedure, or can be a stationary feature in the field setting for performing the calibration procedure. As described herein, the calibration target 106 can be positioned at a same single stationary location relative to the radar devices 104 during an entirety of the calibration procedure. The simulation of changing the location, and thereby adjusting the range, of the calibration target 106 can instead be achieved by modulating the radar transmission signals, as described in greater detail herein. Therefore, because the calibration target 106 remains stationary during the entirety of the calibration procedure, the calibration procedure can be performed in a smaller physical space, in a more rapid timeframe, and is less prone to errors that can result from unintentionally changing the orientation of the calibration target 106 during relocation of the calibration target 106.

In the example of FIG. 1, during the calibration procedure, a first of the radar devices 104 transmits radar transmission signals, shown at 108, from a respective antenna array 110 to the calibration target 106. The radar transmission signals 108 are each reflected from the calibration target 106 as radar reflection signals, shown at 112, that are received at an antenna array 114 each of the radar devices 104. For example, the radar transmission signals 108 can be FMCW signals across a high frequency range (e.g., between approximately 76 to 81 GHz). Each of the radar devices 104 can demodulate the radar reflection signals 112 to obtain characteristics of the IF baseband signals of the radar reflection signals 112 for calibration of the respective one of the radar devices 104, as described herein.

In the example of FIG. 1, the first of the radar devices 104 includes a calibration modulator ("CAL MODULATOR") 116 that is configured to modulate the radar transmission signals 108. While the example of FIG. 1 demonstrates that only the first of the radar devices 104 includes the calibration modulator 116, it is to be understood that all of the radar devices 104 can be fabricated approximately equally, and that the cascaded radar system 102 is not limited to only one of the radar devices 104 including a respective calibration modulator 116. As an example, the first of the radar devices 104 can transmit a first radar transmission signal 108 at a baseline, unmodified IF frequency range spectrum. The radar reflection signals 112 can be received by each of the radar devices 104 and demodulated to obtain a first IF baseband signal that provides a range spectrum that includes a range peak representing the range of the calibration target 106.

Subsequently, the calibration modulator 116 can modulate the IF frequency (e.g., phase modulate or frequency modulate) of the baseline IF frequency range, such that the first of the radar devices 104 can generate a second radar transmission signal 108 at the modulated IF frequency range. Each of the radar devices 104 receives a respective radar reflection signal 112 corresponding to the second radar transmission signal 108 and demodulates the radar reflection signal 112 to obtain a second IF baseband signal. For example, for a given receiving radar device 104, the location of a range peak corresponding to the calibration target 106 can be determined in the second IF baseband signal and can be compared with the location of the range peak in the first IF baseband signal. Furthermore, the range peak in the second IF baseband signal of a given radar device 104 can be compared with the location of the range peak in the second IF baseband signal of the other radar devices 104, to determine an inter-device delay between the radar devices 104.

In the example of FIG. 1, the cascaded radar system 102 includes a calibration component 118 configured to determine and compare the locations of the range peaks in the IF baseband signals and can provide a phase-shift of the digital samples of the demodulated IF baseband signals to provide calibration of the cascaded radar system 102. As an example, the calibration component 118 can be configured as a processor external to and in communication with the radar devices 104, such as a host central processing unit (CPU) of the cascaded radar system 102. In the example of FIG. 1, each of the radar devices 104 is shown as providing a signal, shown as IFBB1 through IFBBN, corresponding to the IF baseband signals as demodulated from each of the respective radar reflection signals 112 at each of the respective radar devices 104. For example, the calibration component 102 can determine a range peak from the demodulated IF baseband signal baseline representing the range of the calibration target 106. In a subsequent demodulated IF modulated baseband signal, the calibration component 118 can determine an adjusted range peak that results from the modulation provided by the transmission modulator 108 in the first of the radar devices 104. In this manner, the modulation of the IF baseband signal provided by the transmission modulator 108 can simulate changes in the location (e.g., range) of the calibration target 106 during the calibration procedure.

In response to processing and identifying the adjusted range peak, the calibration component 118 can implement a phase change of digital samples of the demodulated IF baseband signals to time-align the respective radar device 104 to at least one more of the radar devices 104 with respect to processing the respective IF baseband signals. In the example of FIG. 1, one of the radar devices 104 can provide a reference signal REF to the calibration component 118. While the example of FIG. 1 demonstrates that it is the first of the radar devices 104 providing the reference signal REF, it is to be understood that any of the radar devices 104 can provide the reference signal REF. The calibration component 118 can provide the phase shift of the digital samples relative to the reference signal REF with respect to the given IF modulated baseband signal. For example, the reference signal REF can be a static IF baseband signal (e.g., the IF baseband signal baseline of one of the radar devices 104), such that the calibration component 118 can compare each of the demodulated IF baseband signals (e.g., for each of the IF modulated baseband signals IFBB in the sequence of the calibration procedure) to the reference signal REF. Therefore, the calibration component 118 can provide the appropriate phase-shift to the digital samples across the IF frequency spectrum to time-align the radar devices 104 to the reference signal REF to calibrate the cascaded radar system 102, shown in the example of FIG. 1 as a calibration signal CAL provided to each of the radar devices 100.

Figure 2:
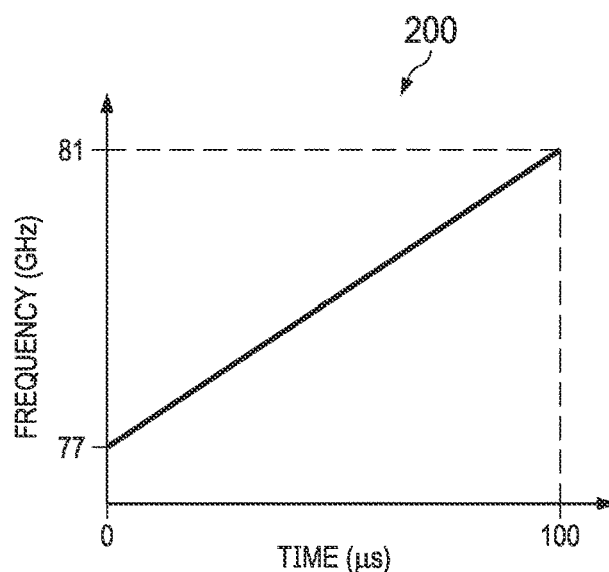
FIG. 2 illustrates an example of a radar transmission signal.

FIG. 2 illustrates an example diagram 200 of a radar transmission signal. The radar transmission signal is shown as an FMCW chirp signal, which can be an electromagnetic wave whose instantaneous frequency varies linearly from 77 GHz to 81 GHz from a time at 0 μs to a time at 100 μs, with a slope of approximately 4 GHz/100 μs rate. For example, the radar transmission signal in the example of FIG. 2 can correspond to the radar transmission signal 108 in the example of FIG. 1. As an example, the radar transmission signal can be generated by the local oscillator (LO) of one of the cascaded radar devices. As a first radar transmission signal, the FMCW chirp signal is transmitted by one transmitter (referred to hereinafter as "X") of the radar device. As an example, a calibration target (e.g., the calibration target 106) can be placed in front of the radar at a distance d=10 meters.

Figure 3:
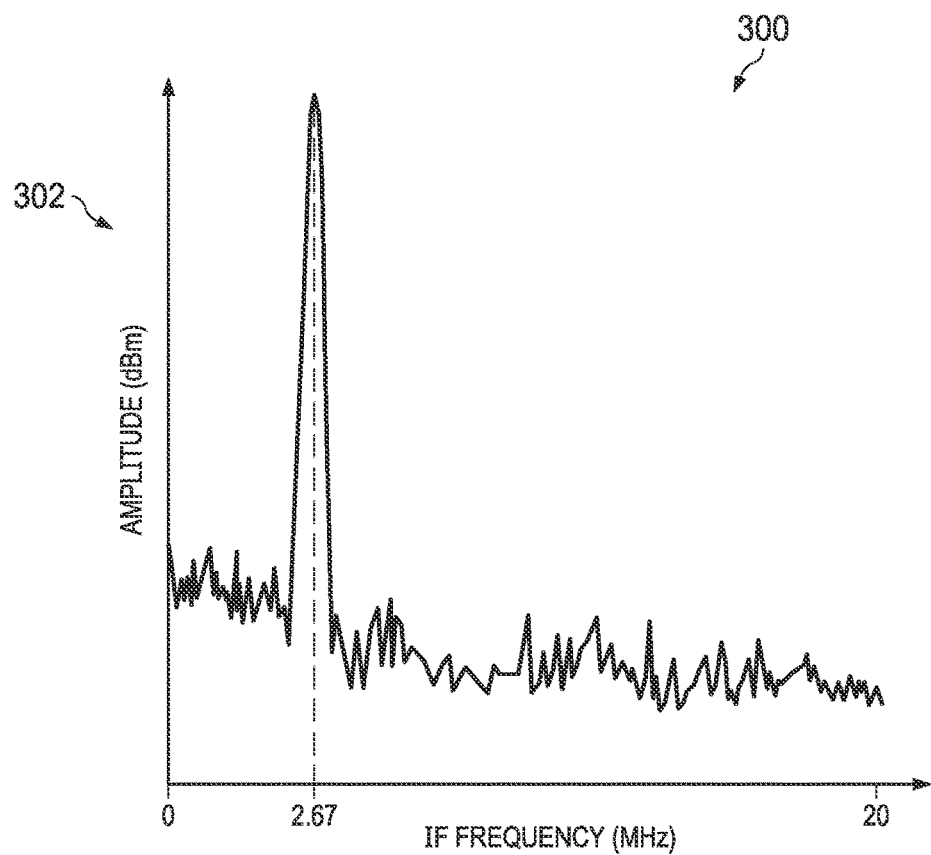
FIG. 3 illustrates an example diagram of an IF range spectrum of IF baseband signals.
Figure 3:
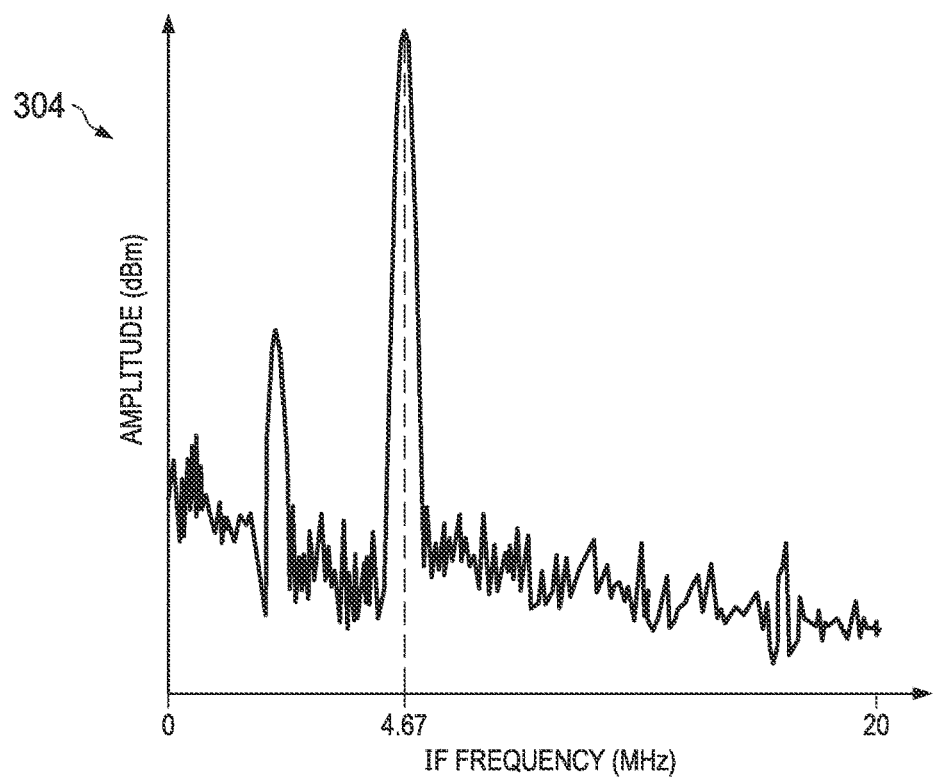

FIG. 3 illustrates an example diagram 300 of an IF range spectrum of IF baseband signals. For example, the reflection of the radar transmission signal in the example of FIG. 2 (e.g., a first radar reflection signal) reaches each receiver in each of the cascaded radar devices (e.g., the radar devices 104). The received radar reflection signal is mixed with the FMCW chirp signal from a local oscillator (LO) in order to obtain a first IF baseband signal having an IF range spectrum shown at 302. The first IF baseband signal is digitized with an analog-to-digital converter (ADC) and the ADC output is processed using digital hardware and software in order to obtain the amplitude and phase of the first baseband signal. For example, the amplitude and phase can be measured at IF frequency given by the following equation:

$$\text{IF frequency} = 2d/c*\text{slope} \quad \text{Equation 1}$$

Where: d=distance of the calibration target from the radar system;
c=the speed of light;
slope=rate of increase of frequency with time for FMCW chirp signal.

The IF range spectrum of the first baseband signal 302 has a peak at 2d/c*slope=approximately 2.67 MHz, as shown in FIG. 3. For example, the IF range spectrum of the IF baseband signal 302 can be obtained by performing Fourier transform of the first IF baseband signal. The relative amplitude and phase differences for the first baseband signal 302 across all receivers of all cascaded radar devices can be stored in a non-volatile memory, for example.

As an example, a second radar transmission signal can be provided from the radar device 104. For example, the second radar transmission signal can be similar to the first radar transmission signal (e.g., the FMCW chirp signal shown in the diagram 200 in the example of FIG. 2). As an example, the calibration modulator 116 in the radar device is enabled and configured to frequency modulate or frequency shift the FMCW chirp signal by an IF modulation frequency, shown to be approximately 2 MHz in the example of FIG. 3. The frequency modulated or frequency shifted signal is then transmitted by the Xth transmitter of the radar device. In this example, the transmitted FMCW signal frequency varies linearly from 77 GHz+2 MHz to 81 GHz+2 MHz from time 0 μs to time 100 μs, at slope=4 GHz/100 μs rate. A second radar reflection signal corresponding to the second radar transmission signal that is received by each receiver in each of the cascaded radar devices. The received second radar reflection signal is mixed with the FMCW chirp signal in the range of approximately 77 to 81 GHz to obtain a second IF baseband signal having an IF range spectrum shown at 304 in the example of FIG. 3. The second baseband signal is digitized by the ADC and then processed in order to obtain phase and amplitude of the second baseband signal at the IF frequency given by the following equation:

IF Frequency=2*d*/*c**slope+IF modulation frequency   Equation 2

As shown in FIG. 3, the IF range spectrum of second baseband signal 304 has a peak at approximately 4.67 MHz (e.g., 2d/c*slope+IF modulation frequency=2.67 MHz+2 MHz). The relative amplitude and phase differences for the second baseband signal across all receivers of all cascaded radar devices can be stored in a non-volatile memory, for example. The calibration component (e.g., the calibration component 118) computes the phase delay and IF filter mismatches from the amplitude and phase differences stored in the memory for the first baseband signal and the second baseband signal A delay imbalance across radar devices can be computed from the phase imbalance measured from the first baseband signal and the second baseband signal. As an example, the phase measurements from multiple receivers can also be averaged while obtaining phase imbalance across radar devices. The delay imbalance is directly proportional to phase imbalance as shown by the following equation:

Δφ=2π*f*T i.e. T=Δφ/2π*f*   Equation 3

Where: Δφ is difference in phase;
T is the delay imbalance; and
f is the frequency of the IF baseband signal.

For example, if two cascaded radar devices are exhibiting 18 degrees (e.g., π/10 rad) mismatch over 2 MHz IF frequency, then the delay imbalance T=(π/10)/(2π*2 MHz)=25 ns. The computation of delay imbalance can be performed by digital hardware or software. The delay imbalance between radar devices can be compensated by configuring additional delay in the radar devices, as described herein. The additional delay in the radar devices can be performed through a FIFO (First-In-First-Out) delay buffer and/or a group delay filter in DFE (Digital Front End) the radar device, as described herein.

Figure 4:
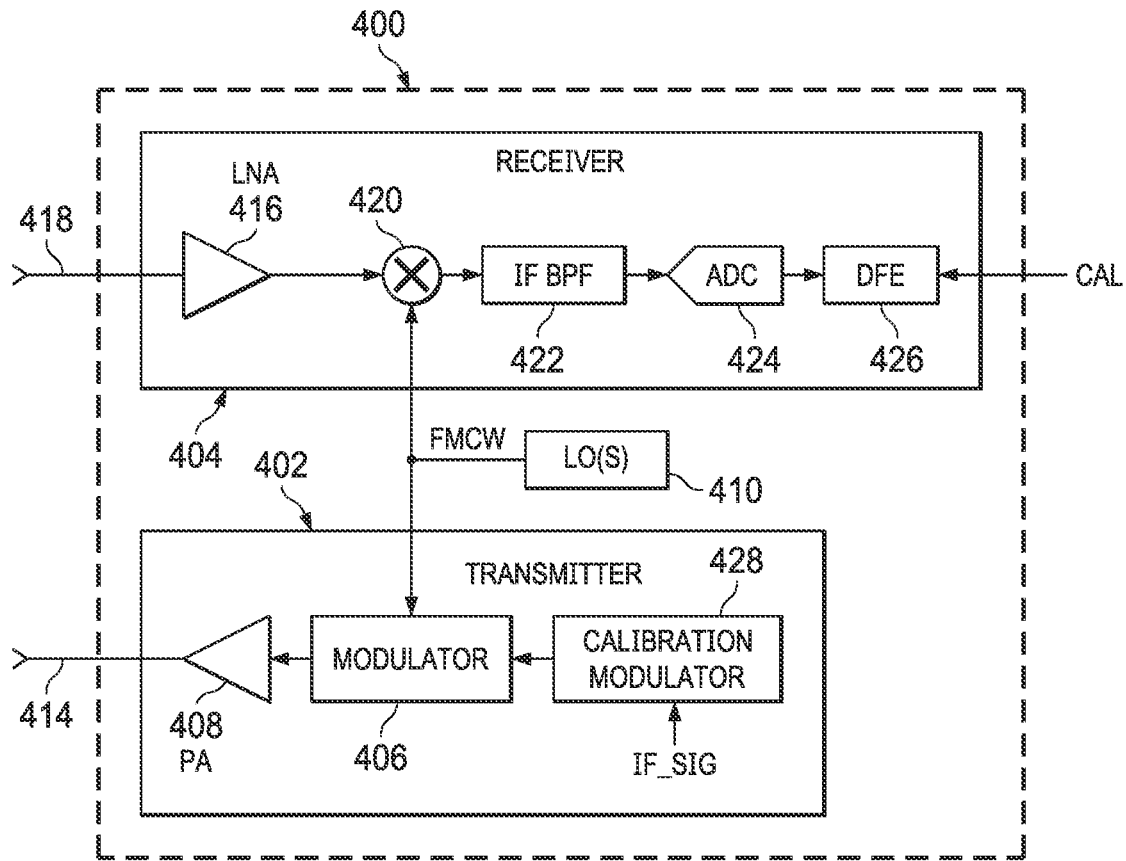
FIG. 4 illustrates an example of a radar device.

FIG. 4 illustrates an example of a radar device 400. The radar device 400 can be any one of the radar devices 104 in the example of FIG. 1. Therefore, reference is to be made to the example of FIGS. 1-3 in the following description of the example of FIG. 4.

The radar device 400 includes at least one transmitter(s) 402 and at least one receiver(s) 404. The transmitter(s) 402 includes a signal chain that includes a calibration modulator 428 coupled to a modulator 406 coupled to a power amplifier 408. The calibration modulator 428 receives a baseline IF signal (IF_SIG) and modulates the baseline IF signal to provide a calibration modulated IF signal. The baseline IF signal may be substantially the same for each transmission during calibration as well as each transmission during regular operation. In order to differentiate the various calibration transmissions, the calibration modulator 428 may apply a frequency shift to the baseline IF signal during some of the calibration transmissions, such as to shift the frequency spectrum of the IF baseband signal for a second transmission relative to a first. In some such examples, the calibration modulator 428 implements the frequency shift by applying binary phase modulation (BPM) by changing the polarity of the power amplifier 408 with a constant frequency. The BPM scheme is equivalent to multiplying the baseline IF signal with a square wave varying between +1 and −1 with a constant frequency. Additionally or in the alternative, in order to differentiate the various calibration transmissions, the calibration modulator 428 may apply a phase shift to the baseline IF signal during some of the calibration transmissions, such as to phase shift the IF baseband signal for a second transmission relative to a first. In this manner, the calibration modulator 428 can modulate the IF baseband signal in a variety of ways. For example, the calibration modulator 428 can provide a prearranged sequence of different modulations to the radar transmission signals 108, with each of the radar devices 104 having information regarding the prearranged sequence.

As described above, the calibration modulator 428 can repeatedly provide a different modulation frequency to and thereby modulate each of a plurality of radar transmission signals 108 in a sequence differently. As a result, each of the radar devices 104, including the radar device 400, can demodulate each of the radar reflection signals 112 in the sequence to generate the IF baseband signals in each of the different modulation schemes. Accordingly, as described above, the radar devices 104 can adjust a phase delay of the digital samples of the IF baseband signals to provide calibration of the cascaded radar system 102.

The modulator 406 is coupled to the calibration monitor 428 to receive the calibration modulated IF signal. The modulator may utilize a FMCW signal or other reference signal output by a local oscillator 410 to perform a baseband up-conversion of the calibration modulated IF signal into a high-frequency (e.g., radio frequency) FMCW chirp signal. The power amplifier 408 is coupled to the modulator 406 and is configured to amplify the high-frequency FMCW chirp signal for transmission from one or more transmission antennas 414 as the radar transmission signals 110.

The receiver(s) 404 includes one or more includes a low-noise amplifier (LNA) 416 that is configured to filter the radar reflection signals 112 that are received by one or more receiver antennas 418. As an example, the transmission antenna(s) 414 and the receiver antenna(s) 418 can be separate antennas or can be the same antennas. The receiver(s) 404 also includes a demodulator 420 that is configured to demodulate the radar reflection signals 112 based on the high-frequency signal MOD provided by the LO 410 to provide the IF baseband signals. The IF baseband signals are provided to an IF bandpass filter (BPF) 422 and are digitized by an analog-to-digital converter (ADC) 424. The digitized IF baseband signal thus corresponds to the digital samples of the IF baseband signal, and are thus provided to a digital front end (DFE) 426 that is configured to process the digital samples to process the corresponding data of the digital samples. For example, the DFE 426 can provide a digital IF range spectrum that can include the range peak corresponding to the range of the calibration target 106.

As described above, the calibration component 118 in the example of FIG. 1 can determine a range peak from the demodulated IF baseband signal baseline representing the range of the calibration target 106. For example, as described above, the range peak of the demodulated IF baseband signal baseline can result in the range peak being located at approximately 2.67 MHz in the IF baseband signal tone. The calibration modulator 428 can modulate the chirp signal FMCW by adding a 2 MHz vector modulation to baseline IF signal in a subsequent radar transmission signal 108. Therefore, in the corresponding demodulated IF baseband signal, the calibration component 118 can search for the adjusted range peak that results from the 2 MHz vector modulation at approximately 4.67 MHz based on the sum of the IF baseband signal baseline and the IF vector modulation frequency. For example, as described previously, the range peaks of the IF frequency spectra can be searched by the calibration component 118 that can be an external processor (e.g., a host central processing unit (CPU) of the cascaded radar system 102) that can monitor the IF frequency spectra of all of the radar devices 400. As an example, the calibration component 118 can calculate the offsets between range peaks of different radar devices 400, and can calculate adjustments for correcting the offsets that can be provided to the DFE 426 of one or more of the radar devices 400, such as based on firmware application programming interfaces (APIs).

Upon identifying the location of the adjusted range peak in the IF modulated baseband signal, the calibration component 118 can identify a delay imbalance and/or amplitude and phase mismatch between the adjusted range peak in the radar device 400 relative to at least one other radar device 104 in the cascaded radar system 102. In the example of FIG. 4, the signal CAL (e.g., provided from the calibration component 118) is provided to the DFE 426. As an example, the calibration signal CAL can be provided based on a comparison of an IF baseband signal spectrum of the DFE 426 with a reference receiver to which the digital samples of all of the IF modulated baseband signals in all of the receivers of the radar devices 104 can be phase-aligned. Therefore, the calibration component 118 can provide a phase-delay of the digital samples to the DFE 426 to compensate for the location of the adjusted range peak of a given IF modulated baseband signal relative to the IF modulated signal baseline for the radar device 400, with respect to the reference receiver, based on the calibration signal CAL to mitigate inter-device delays between the radar devices 104.

For example, the frequency shift caused by the fundamental modulating tone as well as its harmonics can be utilized for implementing the comparison. For example, the IF baseband signal baseline can be shifted by each harmonic tone. As an example, implementing phase shifter vector modulation can implement harmonics due to non-linearity in the modulation. As another example, implementing the square wave binary phase modulation can result in high amplitude harmonic tones. As a result, the calibration component 118 can identify the gain and phase imbalance across substantially all desired IF modulated baseband signals in the calibration sequence.

As an example, the calibration component 118 can calculate a group delay imbalance among the radar devices 104 by differentiating the phase imbalance among the radar devices 400 with respect to the IF baseband signals. The phase imbalance for the IF baseband signal in each of the receivers 404 of each of the respective radar devices 400 can be computed with respect to the reference signal REF from a reference receiver. The delay imbalance for each of the receivers 404 of the respective radar devices 400 can be calculated from the phase imbalance. As an example, the delay can be calculated for a reference signal REF in each of the radar devices 104 assuming that inter-device delay imbalances are negligible. The delay imbalance may be calculated by averaging for each measured IF modulated baseband signal, or may be calculated from a slope of a line-fit or any other statistical approach. For example, the relationship between the phase imbalance ($\Delta\varphi$) and the delay imbalance (T) can be expressed by Equation 3. In response to determining the delay imbalance and/or the phase and amplitude mismatch of the radar device 400 relative to the reference signal REF, the calibration component 118 can facilitate the phase shift of the digital samples of the IF baseband signal in the DFE 426 based on the delay imbalance and/or the phase and amplitude mismatch.

Figure 5:
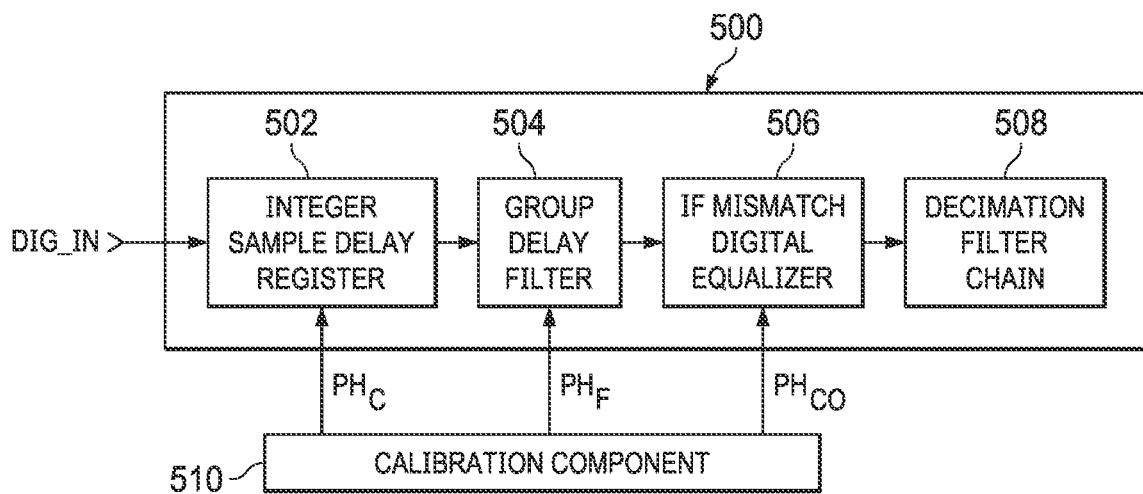
FIG. 5 illustrates another example of a digital front end of a radar device receiver.

FIG. 5 illustrates another example of a DFE 500 of a radar device receiver. The radar device receiver can correspond to the receiver(s) 404 of the radar device 400. Therefore, reference is to be made to the examples of FIGS. 1-4 in the following description of the example of FIG. 5.

The DFE 500 is shown as receiving a signal DIG_IN that can be the digital samples (e.g., output from the ADC 424) of the IF baseband signals of the radar reflection signals 112. Thus, as described above, the DFE 500 is configured to process the digital samples DIG_IN to process the corresponding data of the digital samples (e.g., to determine the range peak of the calibration target 106). In the example of FIG. 5, the DFE 500 includes an integer sample delay register 502, a group delay filter 504, an IF mismatch digital equalizer 506, and a decimation filter chain 508. The decimation filter chain 508 is configured to process the digital samples DIG_IN, such as to generate the IF baseband signal spectrum that includes the range peak. It is to be understood that the DFE 500 can include additional components not shown in the example of FIG. 5 for processing the digital samples DIG_IN. Additionally, the example of FIG. 5 includes a calibration component 510, such as external to the respective radar device 400, that can communicate with the DFE 500. As an example, the calibration component 510 can correspond to the calibration component 118 in the example of FIG. 4. In the example of FIG. 5, the calibration component 510 provides a set of signals $PH_C$, $PH_F$, and $PH_{CO}$ that can correspond collectively to the calibration signal CAL in the example of FIGS. 1 and 4.

To implement the phase-shift of the digital samples DIG_IN, the calibration component 510 can facilitate a coarse and fine adjustment of the digital samples DIG_IN. In the example of FIG. 5, the calibration component 510 is shown as providing a coarse adjustment signal $PH_C$ to the integer sample delay register 502 to implement a sample shift of the digital samples in the integer sample delay register 502. As an example, the integer sample delay register 502 can be configured as a first-in-first-out (FIFO) buffer, such that the coarse adjustment signal $PH_C$ can provide an integer sample delay in the integer sample delay register 502 to provide the coarse phase shift. For example, the integer sample delay register 502 can be configured to delay the shift of digital samples in multiples of clock cycles of the ADC 424. Therefore, if the ADC 424 is operating at a given frequency (e.g., 1.8 GHz), then the sampling time of the ADC 424 can be the coarse delay time (e.g., 0.55 nanoseconds). Accordingly, by delaying the shift of the digital samples DIG_IN in the integer sample delay register 502, the calibration component 510 can implement a coarse delay time at each of the sampling time cycles of the ADC 424.

Additionally, in the example of FIG. 5, the calibration component 510 is shown as providing a fine adjustment signal $PH_F$ to the group delay filter 504 to implement a sample shift of the digital samples in the group delay filter 504. As an example, the group delay filter 504 can be configured to implement an approximate linear phase response and a flat amplitude response to achieve a fractional sample delay. Therefore, the fine adjustment signal $PH_F$ can be provided to correct a residual delay imbalance at a finer resolution than the coarse resolution of the integer sample delay register 502 that has a resolution that is limited to the sampling time cycles of the ADC 424. As a result, based on the coarse and fine adjustment provided by the respective integer sample delay register 502 and the group delay filter 504 based on the respective coarse and fine adjustment signals $PH_C$ and $PH_F$, the calibration component 510 can provide sufficient phase-shift of the digital samples DIG_IN, such as to approximately time-align the digital samples to the reference signal REF.

Furthermore, in the example of FIG. 5, the calibration component 510 is shown as providing a control signal $PH_{CO}$ to the IF mismatch digital equalizer 506. As an example, the IF mismatch digital equalizer 506 can compensate for the mismatch in low-pass filter (LPF) cutoffs of the IF BPF 422 of the radar device 400 relative to the other radar devices 104. For example, the IF mismatch digital equalizer 506 can adjust the LPF cutoff frequency of the IF BPF to compensate for a gain and phase imbalance resulting from a mismatch of the IF BPF 422 of the radar device 400 relative to the other radar devices 104. Such imbalances of the LPF cutoff frequencies between the IF BPF 422 the respective radar devices 104 can result in gain and phase imbalances of the IF baseband signals between the respective radar devices 104. Accordingly, the calibration component 510 can determine the gain and phase imbalances between the radar devices 104 and can provide the control signal $PH_{CO}$ to adjust the LPF cutoff frequency of the associated BPF 422 to mitigate the gain and phase imbalance of the radar device 400 relative to the other radar devices 104 in the cascaded radar system 102.

As a result, as described above, the calibration component 510 can adjust the characteristics of the DFE 500 to time-align the radar device 400 with the other radar devices 104 of the cascaded radar system 102 to calibrate the cascaded radar system 102. As described above, based on the phase and/or amplitude mismatch of the IF baseband signal relative to the IF baseband signal of the other radar devices 104 and/or the reference signal REF, the calibration component 510 can facilitate a phase shift of the digital samples DIG_IN in coarse and fine adjustments based on the respective coarse and fine adjustment signals $PH_C$ and $PH_F$ to the integer sample delay register 502 and a group delay filter 504, respectively. Furthermore, as also described above, based on the gain and phase imbalance resulting from an IF filter mismatch of the radar device 400 relative to the other radar devices 104 of the cascaded radar system 102, the calibration component 510 can mitigate the gain and phase imbalance based on adjusting the cutoff frequency of the associated LPF of the DFE 500. Accordingly, the sample delay of the digital samples DIG_IN and the cutoff frequency of the LPF can be adjusted for each of the radar devices 104 to calibrate the cascaded radar system 102 during a calibration procedure in which the calibration target 106 is positioned at a single stationary location during the entirety of the calibration procedure. As a result, the cascaded radar system 102 can be calibrated without moving the calibration target 106 (e.g., based on frequency modulation of the radar transmission signals 108), which can provide significant time savings in a smaller calibration area and with less potential for errors, as opposed to typical calibration procedures for cascaded radar systems.

Figure 6:
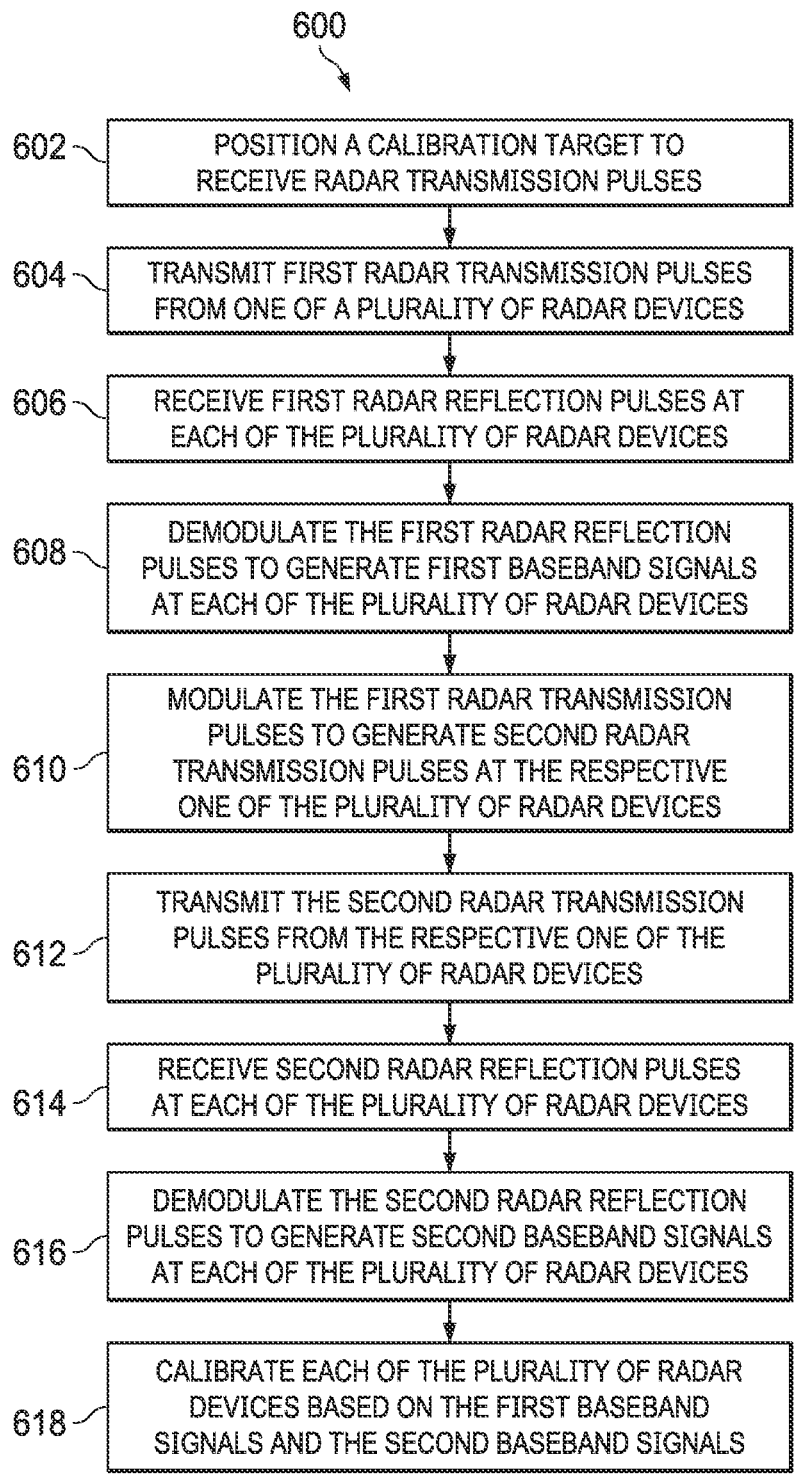
FIG. 6 illustrates an example of a method for calibrating a cascaded radar system.

FIG. 6 illustrates an example of a method 600 for calibrating a cascaded radar system (e.g., the cascaded radar system 102). It is to be understood and appreciated that the method of FIG. 6 is not limited by the illustrated order, as some aspects could, in accordance with the present disclosure, occur in different orders and/or concurrently with other aspects from that shown and described herein. Moreover, not all illustrated features may be required to implement a methodology in accordance with an aspect of the present examples.

At 602, a calibration target (e.g., the calibration target 106) is positioned to receive radar transmission signals (e.g., the FMCW radar transmission signals 108). At 604, first radar transmission signals (e.g., the radar transmission signals 108) are transmitted from one of a plurality of radar devices (e.g., the radar devices 104). At 606, first radar reflection signals (e.g., the radar reflection signals 112) are received at each of the plurality of radar devices. The first radar reflection signals can correspond to the respective first radar transmission signals reflected from the calibration target. At 608, the first radar reflection signals are demodulated to generate first baseband signals at each of the plurality of radar devices. At 610, the first radar transmission signals are frequency-modulated to generate second radar transmission signals at the respective one of the plurality of radar devices. At 612, the second radar transmission signals are transmitted from the respective one of the plurality of radar devices. At 614, second radar reflection signals are received at each of the plurality of radar devices. The second radar reflection signals can correspond to the respective second radar transmission signals reflected from the calibration target. At 616, the second radar reflection signals are demodulated to generate second baseband signals at each of the plurality of radar devices. At 618, the cascaded radar system is calibrated based on the first baseband signals and the second baseband signals of each of the radar devices. In some examples, the calibration includes comparing the first baseband signals produced by a given radar device to the second baseband signals produced by the radar device. In some examples, the calibration includes comparing the first or second baseband signals produced by a first radar device to the first or second baseband signals produced by a second radar device.

Modifications are possible in the described embodiments, and other embodiments are possible, with the scope of the claims. The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Furthermore, a circuit or device that is said to include certain components may instead be configured to couple to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be configured to couple to at least some of the passive elements and/or the sources to form the described structure either at a time of manufacture or after a time of manufacture, for example, by an end-user and/or a third-party.

What is claimed is:

1. A method for calibrating a cascaded radar system, the method comprising:
    transmitting a first radar transmission signal from one of a plurality of radar devices;
    receiving a respective first radar reflection signal produced by a calibration target at each of the plurality of radar devices;
    demodulating the respective first radar reflection signal to generate a respective first baseband signal at each of the plurality of radar devices;
    generating a second radar transmission signal that is modulated with respect to the first radar transmission signal at the one of the plurality of radar devices;
    transmitting the second radar transmission signal from the respective one of the plurality of radar devices;
    receiving a respective second radar reflection signal produced by the calibration target at each of the plurality of radar devices;
    demodulating the respective second radar reflection signal to generate a respective second baseband signal at each of the plurality of radar devices; and
    calibrating the plurality of radar devices based on the first baseband signals and the second baseband signals.

2. The method of claim 1, wherein an IF range spectrum of the first baseband signals have a first range peak at a frequency corresponding to a range of the calibration target, wherein modulating the first radar transmission signal comprises adding a modulation IF frequency to the first radar transmission signals, wherein the IF range spectrum of the second baseband signals have a second range peak at a frequency equal to the first range peak plus the modulation IF frequency.

3. The method of claim 1, wherein the modulation of the second radar transmission signal with respect to the first radar transmission signal includes a frequency shift to provide a range peak at an IF frequency in an IF range spectrum, wherein demodulating the first radar reflection signals comprises demodulating the first radar reflection signals to generate the first baseband signals at each of the plurality of radar devices to determine the range peak representing the calibration target, and wherein calibrating each of the plurality of radar devices comprises calibrating each of the plurality of radar devices based on the range peak relative to a range peak representing the calibration target of the second baseband signals.

4. The method of claim 1, further comprising:
    generating a third radar transmission signal at the respective one of the plurality of radar devices that is modulated with respect to the first radar transmission signal, the third radar transmission signal being different from the second radar transmission signal;
    transmitting the third radar transmission signal from the one of the plurality of radar devices;
    receiving a respective third radar reflection signals from the calibration target at each of the plurality of radar devices; and
    demodulating the third radar reflection signals to generate third baseband signals at each of the plurality of radar devices, wherein calibrating each of the plurality of radar devices comprises calibrating the plurality of radar devices based on the first, second, and third baseband signals.

5. The method of claim 1, wherein modulating the first radar transmission signals comprises increasing a phase of the first radar transmission signal linearly over time at a configurable rate to generate the second radar transmission signal at the respective one of the plurality of radar devices.

6. The method of claim 1, wherein modulating the first transmission signals comprises modulating the first transmission signals with a binary-phase modulation signal with a configurable modulation frequency.

7. The method of claim 1, wherein calibrating the plurality of radar devices comprises calibrating each of the plurality of radar devices based on at least one of a phase difference and an amplitude difference between the first baseband signals of one of the plurality of radar devices relative to at least one other one of the plurality of radar devices and between the second baseband signals of one of the plurality of radar devices relative to at least one other one of the plurality of radar devices.

8. The method of claim 7, further comprising calculating a group delay imbalance based on calculating a delay of the at least one of the phase difference and the amplitude difference of each of the plurality of radar devices for each of the first and second baseband signals relative to a reference signal of one of the plurality of radar devices.

9. The method of claim 1, wherein the calibration target is positioned at a same single stationary location relative to the plurality of radar devices during an entirety of an associated calibration procedure.

10. The method of claim 1, wherein calibrating each of the plurality of radar devices comprises determining at least one of a phase and amplitude mismatch of each of the plurality of radar devices relative to a reference signal of one of the plurality of radar devices, the method further comprising adjusting a phase and amplitude of received radar reflection signals at each of the plurality of radar devices.

11. The method of claim 10, wherein adjusting the phase comprises:
    adjusting an integer sample delay of a first-in-first-out (FIFO) buffer to provide a coarse adjustment to the phase; and
    adjusting a fractional sample delay of a group delay filter to provide a fine adjustment to the phase.

12. The method of claim 10, wherein adjusting the phase and amplitude comprises adjusting a cutoff frequency of a low-pass filter (LPF) to compensate for a gain and phase imbalance resulting from an IF bandpass filter mismatch of a respective one of the plurality of radar devices relative to the one of the plurality of radar devices of the reference signal.

* * * * *